(12) United States Patent
Azuma

(10) Patent No.: US 7,999,677 B2
(45) Date of Patent: Aug. 16, 2011

(54) RFID INLAY STRUCTURE AND METHOD OF MANUFACTURING RFID INLAY STRUCTURE

(75) Inventor: Junji Azuma, Elk Grove Village, IL (US)

(73) Assignee: Omron Corporation, Kyoto (JP)

( * ) Notice: Subject to any disclaimer, the term of this patent is extended or adjusted under 35 U.S.C. 154(b) by 602 days.

(21) Appl. No.: 12/213,455

(22) Filed: Jun. 19, 2008

(65) Prior Publication Data

US 2009/0315718 A1    Dec. 24, 2009

(51) Int. Cl.
*G08B 13/14* (2006.01)
(52) U.S. Cl. .................................................. 340/572.1
(58) Field of Classification Search .... 340/572.1–572.9; 343/872
See application file for complete search history.

(56) References Cited

U.S. PATENT DOCUMENTS

| 6,281,850 | B1 * | 8/2001 | Klostermann ................ 343/702 |
| 7,704,790 | B2 * | 4/2010 | Morinaga et al. ............. 438/106 |
| 2006/0097057 | A1 | 5/2006 | Porad |
| 2007/0007344 | A1 * | 1/2007 | Inoue et al. ................... 235/435 |
| 2007/0216534 | A1 * | 9/2007 | Ferguson et al. .......... 340/572.7 |
| 2008/0130018 | A1 * | 6/2008 | Steenblik et al. ............. 356/625 |

FOREIGN PATENT DOCUMENTS

JP   2007-187767   7/2007
JP   2007-264868   10/2007

* cited by examiner

*Primary Examiner* — Phung Nguyen
(74) *Attorney, Agent, or Firm* — Dickstein Shapiro LLP (57) ABSTRACT

RFID tags each having an antenna partially raised from a surface of an underlying object by use of embossments in the RFID inlay base structure. Also disclosed are methods of forming the RFID tags and an RFID system utilizing the RFID tags.

27 Claims, 11 Drawing Sheets

RFID INLAY STRUCTURE AND METHOD OF MANUFACTURING RFID INLAY STRUCTURE

DESCRIPTION OF RELATED ART

Radio frequency identification (RFID) systems are becoming an increasingly popular technology for wirelessly storing and remotely retrieving data, such as identification information, from objects. A common application for RFID technology is a retail store, where information related to each piece of merchandise, such as a product code or the price of the product, is stored and can easily be read out by scanning the RFID tag on the product. Other known applications for RFID technology include identification of persons and animals as well as certain forms of electronic payment.

In an RFID system, an RFID tag—also known as an RFID transponder or RFID inlay—is attached to an object. The RFID tag includes an integrated circuit chip connected to a radio frequency antenna, which may include a looped antenna for high frequency (HF) applications or a solid antenna for ultra high frequency (UHF) applications. The integrated circuit chip functions as a digital memory, storing data on the underlying object. A second component of the RFID system is an RFID reader, which sends signals to and receives signals from the RFID inlay to extract data that is stored in the chip within the inlay. An RFID encoder, which may or may not be within the same device as the RFID reader, is used to write information to the RFID tag.

It is known that RFID technology faces potential drawbacks depending on the environment in which it is utilized, and more specifically, depending on the underlying material object where the RFID tag is attached. For example, if the RFID tag is used in connection with a metal object, signal interference can occur and an improper reading or writing of data from or to the RFID chip can also occur. A similar interference phenomenon occurs if there is water present on the surface of underlying object.

One approach for dealing with this potentially detrimental interference is disclosed in U.S. Patent Publication No. 2006/0097057. There, it is suggested that an absorber material be affixed to the RFID inlay surface for reducing electromagnetic interference with an underlying metal object. While the absorber may serve to raise the RFID antenna from the underlying interfering surface, adding an appropriate absorber material adds an additional cost to manufacturing the RFID tags.

Accordingly, there is a need for RFID tags that can be easily written to, or read from, without suffering detrimental environmental affects. Also desired is a method of making such RFID inlays inexpensively and without damaging the integrated circuit chip built therein.

BRIEF DESCRIPTION OF THE DRAWINGS

The foregoing and other advantages and features will become more apparent from the detailed description of exemplary embodiments described below with reference to the accompanying drawings in which.

DETAILED DESCRIPTION OF THE INVENTION

In the following detailed description, reference is made to the accompanying figures, which illustrate the described embodiments. The embodiments are described in sufficient detail to enable those skilled in the art to make and use them.

It is to be understood that additional embodiments may be used and that structural or operational changes to the embodiments herein described can be made. Similarly, where exemplary methods of manufacturing are described, fewer or additional steps may be utilized in practice, and unless otherwise noted, the steps may be performed in any sequential manner. Accordingly, while exemplary embodiments are described, other embodiments having the same or different structures are also within the claimed invention.

Figure 1:
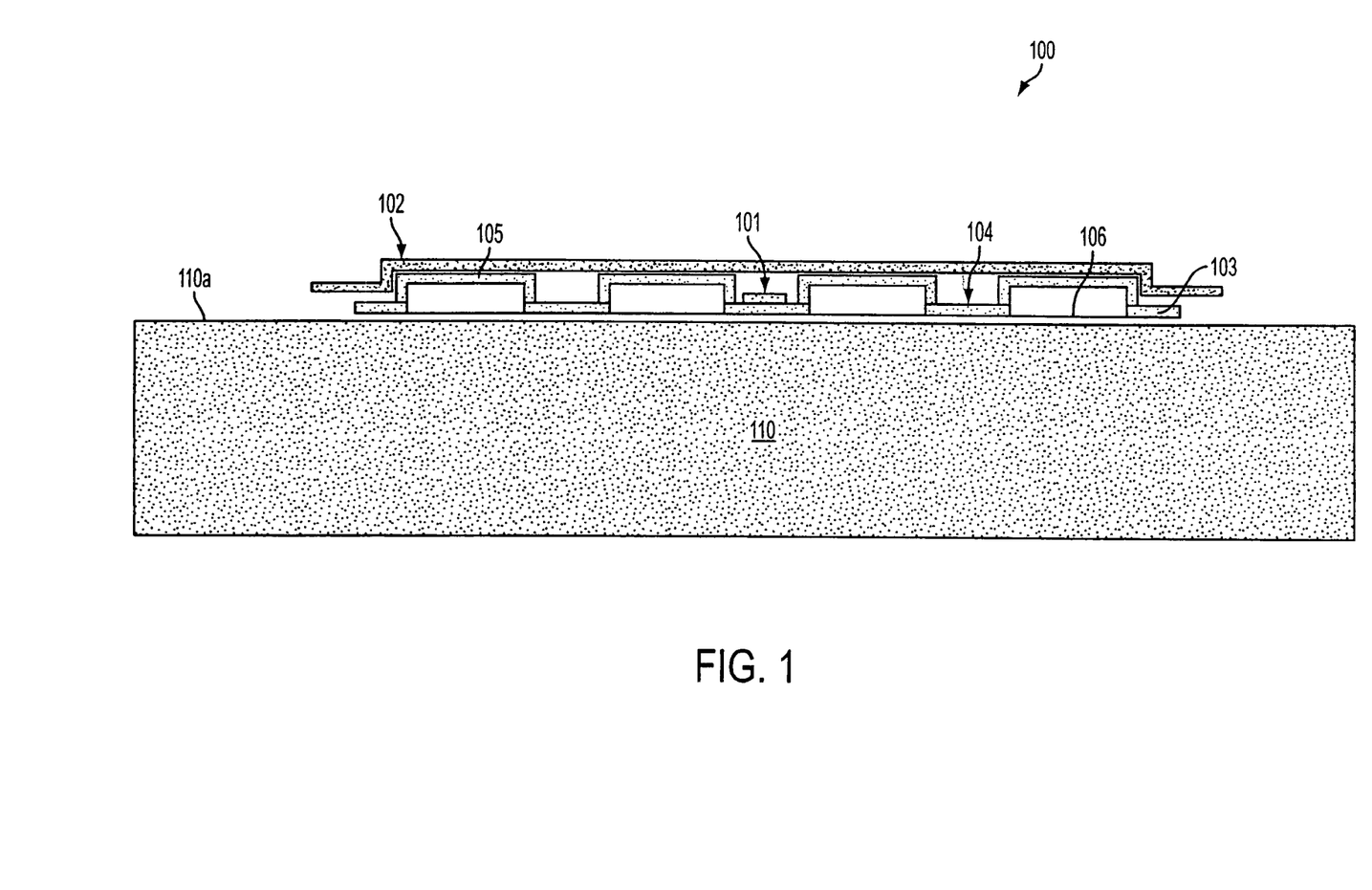
FIG. 1 is a cross-sectional view of an RFID tag constructed in accordance with a first exemplary embodiment of the invention.
Figure 2:
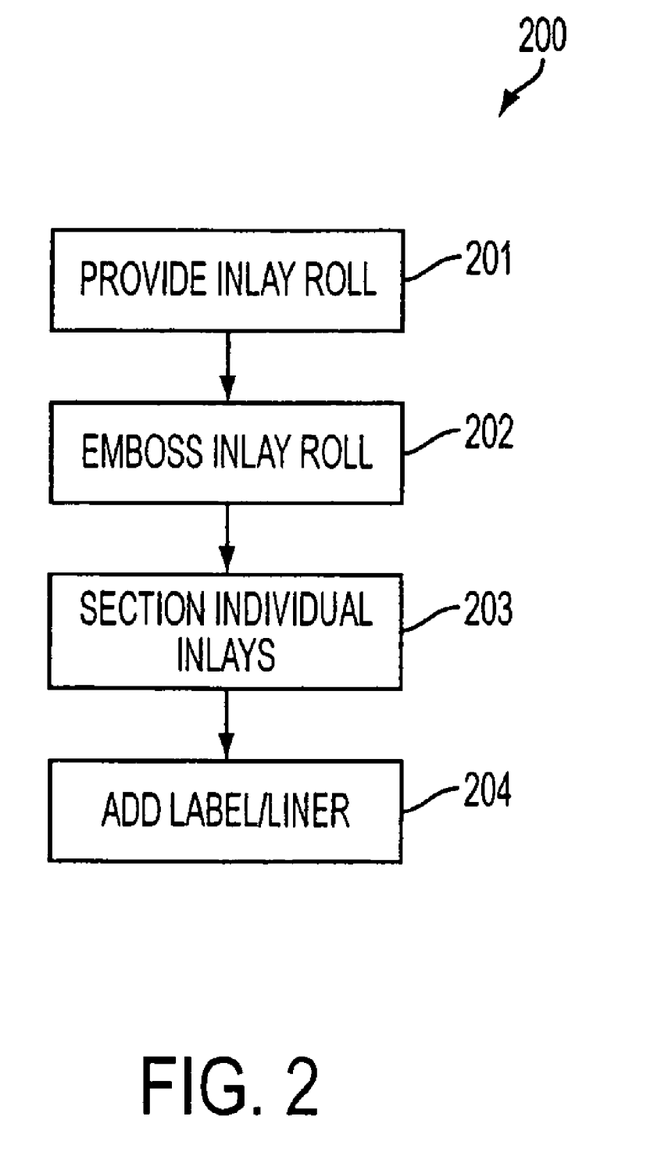
FIG. 2 is a flow diagram depicting steps in making RFID tags in accordance with a first exemplary method.

Now, with reference to the drawings, where like numerals represent like elements, FIG. 2 is a flowchart depicting a first exemplary method 200 of making RFID tags. FIG. 1 depicts a cross-sectional view of an RFID tag 100 constructed in accordance with method 100 outlined in FIG. 2. The illustrated RFID tag 100 is shown attached to a material 110, which may include metal or water near a surface 110a thereof. Due to the surface 110a environment, a conventional RFID tag would experience interference during the data reading and/or writing processes. The RFID tag 100 avoids these potential drawbacks for the reasons described herein.

The RFID tag 100 includes an RFID inlay base 103. The base 103 has a first surface layer 104 and embossments 105 that are raised above the first surface layer 104. As shown, the RFID tag 100 has four embossments 105 that are generally rectangular in shape. The embossments need not be rectangular, however, as discussed in more detail below. Over a top surface of the embossments 105 is a label 102. A liner 106 (shown in more detail in FIG. 5) is located on a bottom surface of the inlay base 103. FIG. 1 shows the RFID tag 100 with the liner 106 before adhering to the material surface 110a. Once the liner 106 is removed, the bottom surface of the inlay base 103 is adhesive and adheres the RFID tag 100 to the material surface 110a. An integrated circuit chip 101 is located on the inlay base 103 at the first surface layer 104.

As described in more detail below, the RFID antenna 107 (FIG. 4) tracks the surface of the RFID inlay base 103; accordingly, the RFID antenna 107 is raised from the surface region 110a that is responsible for the interference described above. Raising the RFID antenna 107 reduces the amount of interference so that data can easily be written to and read from the RFID tag 100.

Figure 3:
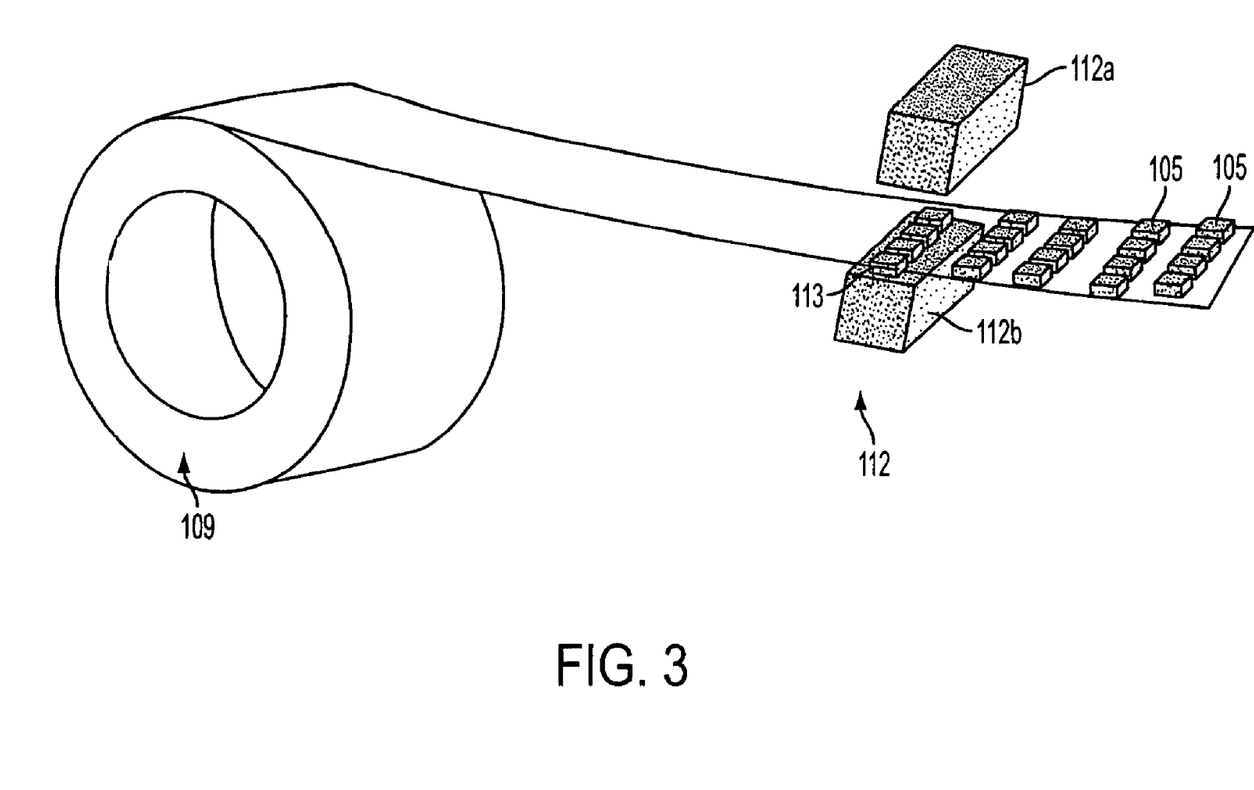
FIG. 3 is an explanatory view of an RFID inlay roll used in connection with the exemplary method of FIG. 2.

With reference to FIGS. 2 and 3, at step 201 of method 200, an inlay roll 109 is provided. The inlay roll 109 may be formed of any suitable material, but is preferably made of polyethylene terephthalate (PET) for its strength. Other suitable materials may include resin or paper. At step 202, the inlay roll 109 is embossed using a mold 112. The mold 112 includes a top mold base 112a that contacts a top surface of the inlay roll 109 and a bottom mold base 112b that contacts the bottom surface of the inlay roll 109. As shown, the bottom mold base 112b has four raised rectangular portions 113. It should be appreciated that the underneath side of the top mold base 112a would have four mating depressed sections. Thus, when the mold base 112 is pressed in contact with the inlay roll 109, it causes the surface of the inlay roll 109 to be raised, forming embossments 105 that track the shape of the raised rectangular portions 113. During mass manufacturing of the RFID tags 100, the mold base 112 can be operated by machine to emboss each of the areas of the inlay roll 109 where the individual tags 100 will eventually be sectioned.

Figure 4:
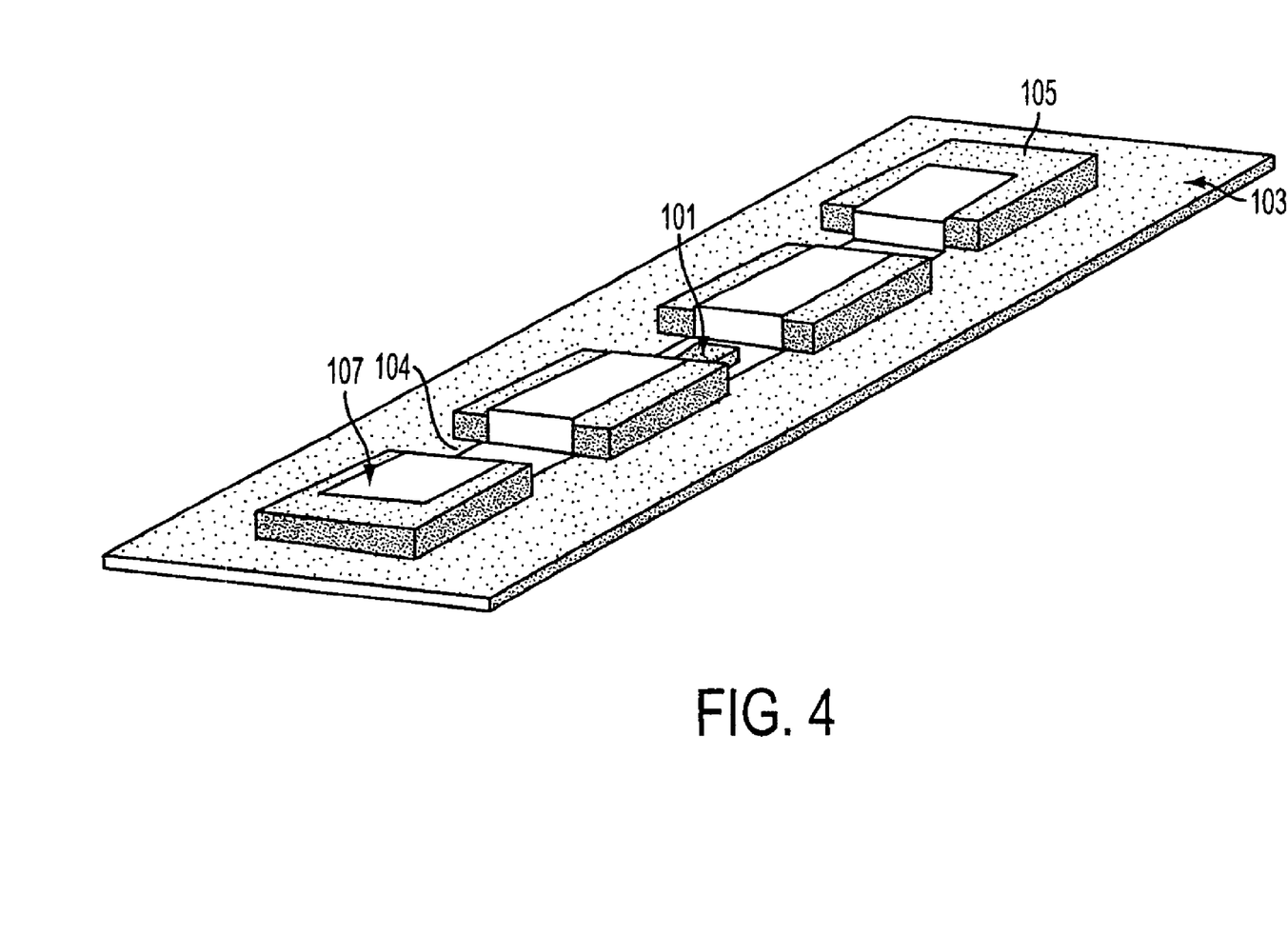
FIG. 4 is a perspective view of an RFID tag at one step in the exemplary method shown in FIG. 2.

Next, at step 203, the inlay roll 109 is sectioned to form individual RFID tags 100, an example of which is depicted in FIG. 4. Although shown and described in a certain order, steps 202 and 203 may be performed in either order, such that the inlay roll 109 can be sectioned prior to embossing. The FIG. 4 RFID tag 100 has an inlay base 103 that has embossments 105 and recess portions at the surface layer 104. Although shown as having four embossments 105, the RFID tag 100 may have any desired number. One advantage to increasing the number of embossments 105 is that they can increase the strength of the inlay base 103. In addition, although shown as rectangular, the embossments 105 may be formed in other shapes as described in more detail below.

The individual RFID tag 100 may be of any desired dimensions; typical dimensions are four inches by a half-inch. The embossments 105 may also be placed at any desired distance from one another. The RFID tag 100 is shown in FIG. 4 having approximately sixty percent of its surface area covered by embossments 105, however, the invention is in no way limited by the percentage of raised surface area. More than sixty percent of the surface area of the RFID tag 100 may be raised above the surface layer 104. Maximizing the percentage of the surface area of the inlay base 103 that is raised above the surface region 104 advantageously minimizes the interference from the underlying material 110. It should be noted that percentages as low as approximately fifty percent experience improvement over conventional RFID tag designs. The embossments 105 may also be of any height that will maintain the desirous characteristics of a strong tag having minimized interference with the underlying object material 110. In a preferred embodiment, the embossments 105 may be several millimeters high. Embossments 105 having a height of five millimeters above the surface layer 104 have shown a decrease in the transmission interference without sacrificing the strength of the inlay base 103.

An upper portion of the inlay base 103 has an antenna 107. As shown in FIG. 4, the antenna 107 tracks the upper surface of the base layer 103 such that it is in contact with the top surface of both the embossed regions 105 and the surface layer 104. The antenna 107 may be made of any material suitable for RFID tags, including but not limited to aluminum, copper, and silver. The RFID chip 101 is located over the antenna 107 near the surface layer 104. Alternatively, the RFID chip 101 may be located over any portion of the antenna 107, including on an embossment 105.

Figure 5:
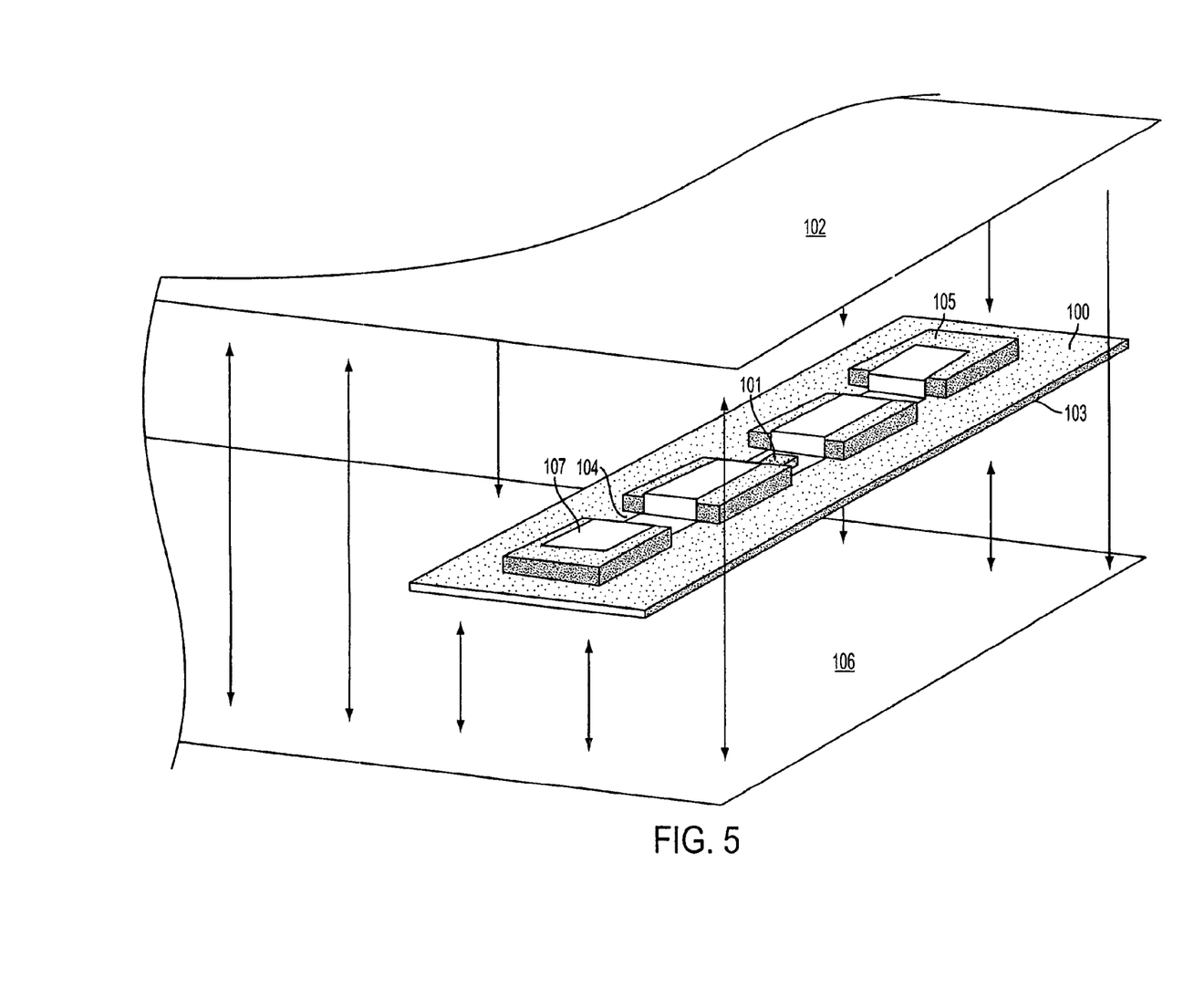
FIG. 5 is a perspective view of the RFID tag of FIG. 4 at a subsequent step of the exemplary method of FIG. 2.

Subsequently at step 204, as shown in FIG. 5, a label 102 is placed over the top of the antenna 107, chip 101, embossments 105, and inlay base 103, forming the RFID tag 100. The label 102 has an adhesive bottom side for adhering to the top of the embossments 105. As shown in FIG. 1, when the label 102 is added after the embossments 105 are formed, the label 102 preferably makes a flat surface. The label 102 may contain, for example, information about the underlying object material 110. In addition, a liner portion 106 may be added at a bottom surface of the inlay base 103. The arrows shown in FIG. 5 depict that downward pressure is applied to adhere the label 102 to the tag portions while the liner 106 is pushed upwardly. The label 102 and liner 106 may be made of any materials suitable for use in RFID technology. That is, the material should not affect the transmission or reception properties of the RFID tag 100. Preferably, the label 102 is made from a printable material, such as paper.

Figure 6:
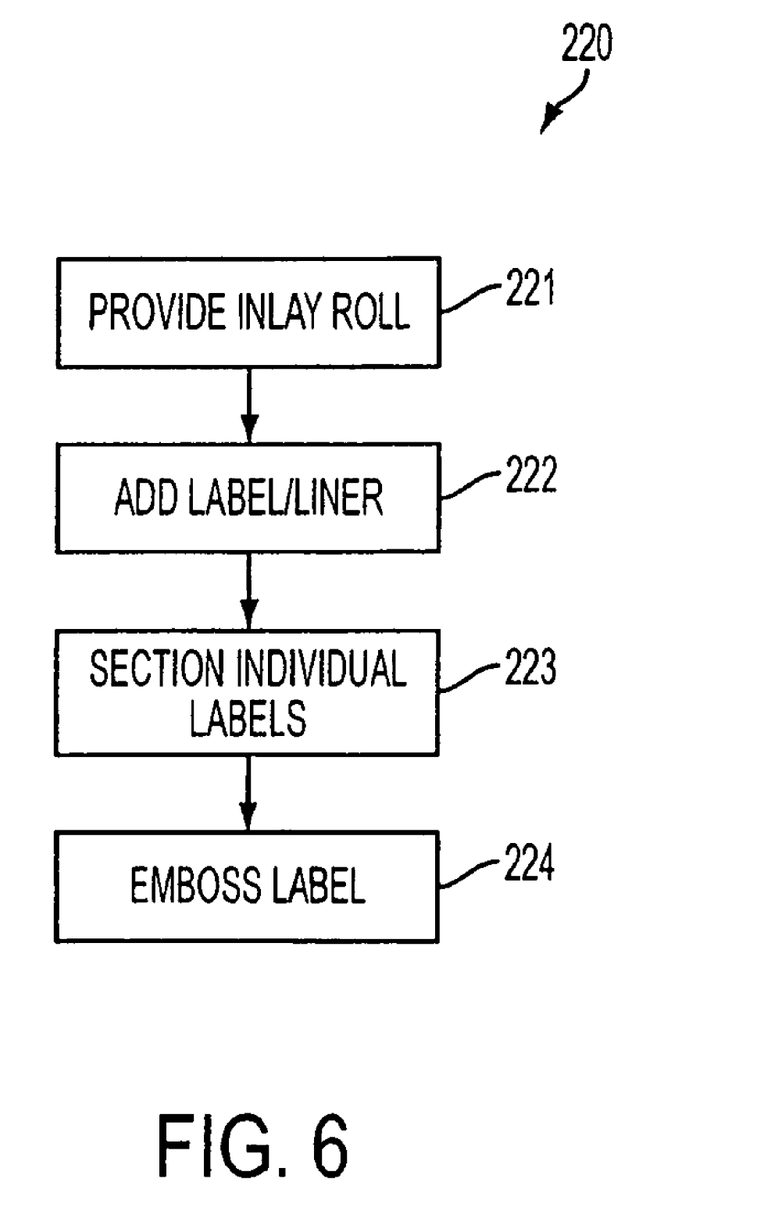
FIG. 6 is a flow diagram depicting steps in making RFID tags in accordance with a second exemplary method.

Steps for a second exemplary method 220 are shown in FIG. 6. In accordance with this method 220, the step of embossing the inlays (i.e., step 224) is not performed until after the labels are added and the individual inlays are sectioned (steps 222 and 223, respectively). In method 220, there is no need to section and/or emboss until after label converters add labels to inlays. The steps of sectioning and embossing are placed at the end of the whole process. Inlay makers can supply inlay rolls to label converters, and the label converters can add labels to the inlay rolls without sectioning and/or embossing. The process gets more machine operable. Thus, it becomes drastically easier for both inlay makers and label converts to mass produce labels as a final product.

Figure 7:
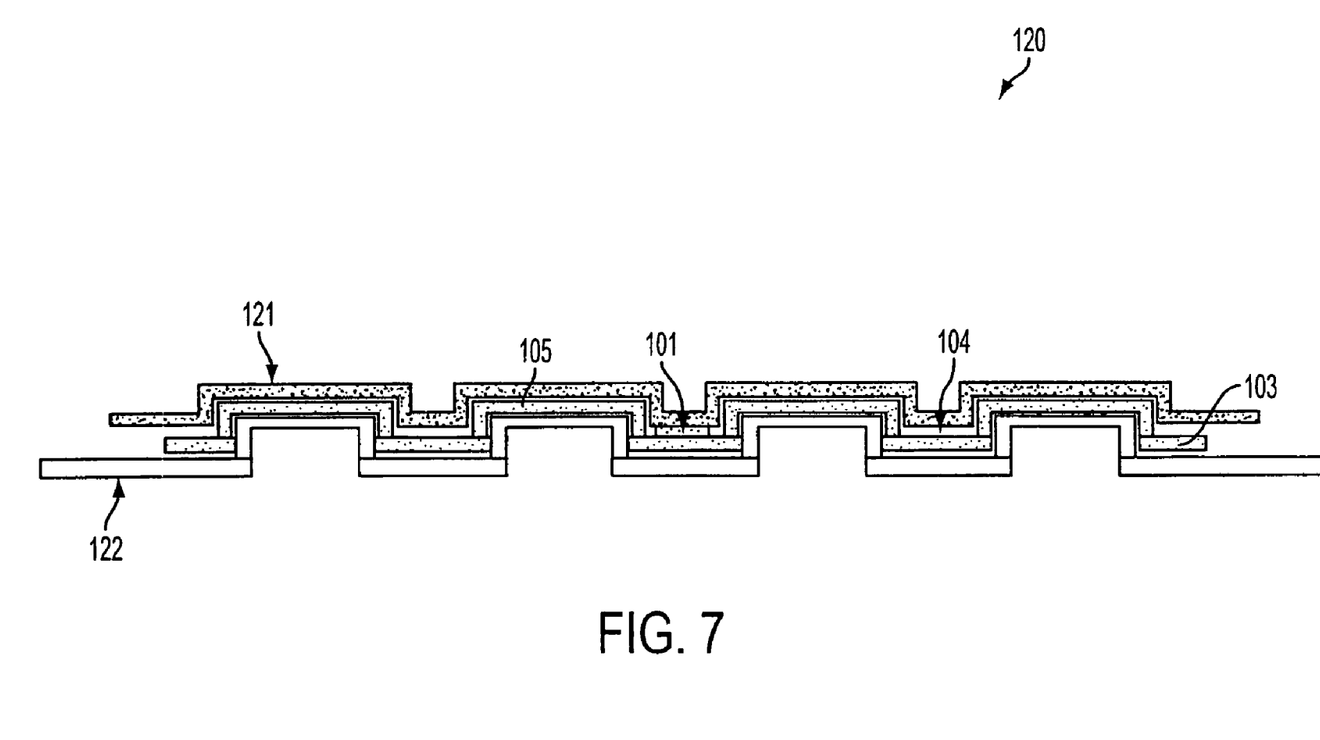
FIG. 7 is a cross-sectional view of an RFID tag constructed in accordance with the second exemplary method of FIG. 6.

FIG. 7 shows an RFID tag 120 constructed in accordance with method 220. As shown, because the embossing occurs later in the process, label 121 and liner 122 follow the same shape of the inlay base 103. That is, the label 121 and liner 122 are not flat like the label 102 and liner 106 are in the first exemplary RFID tag 100, but rather, the label 121 and liner 122 have two surface layers that follow the shape of the embossments 105 and the recessed region of surface layer 104. However, this may make it difficult to read any printing that is put on the label 121.

Figure 8:
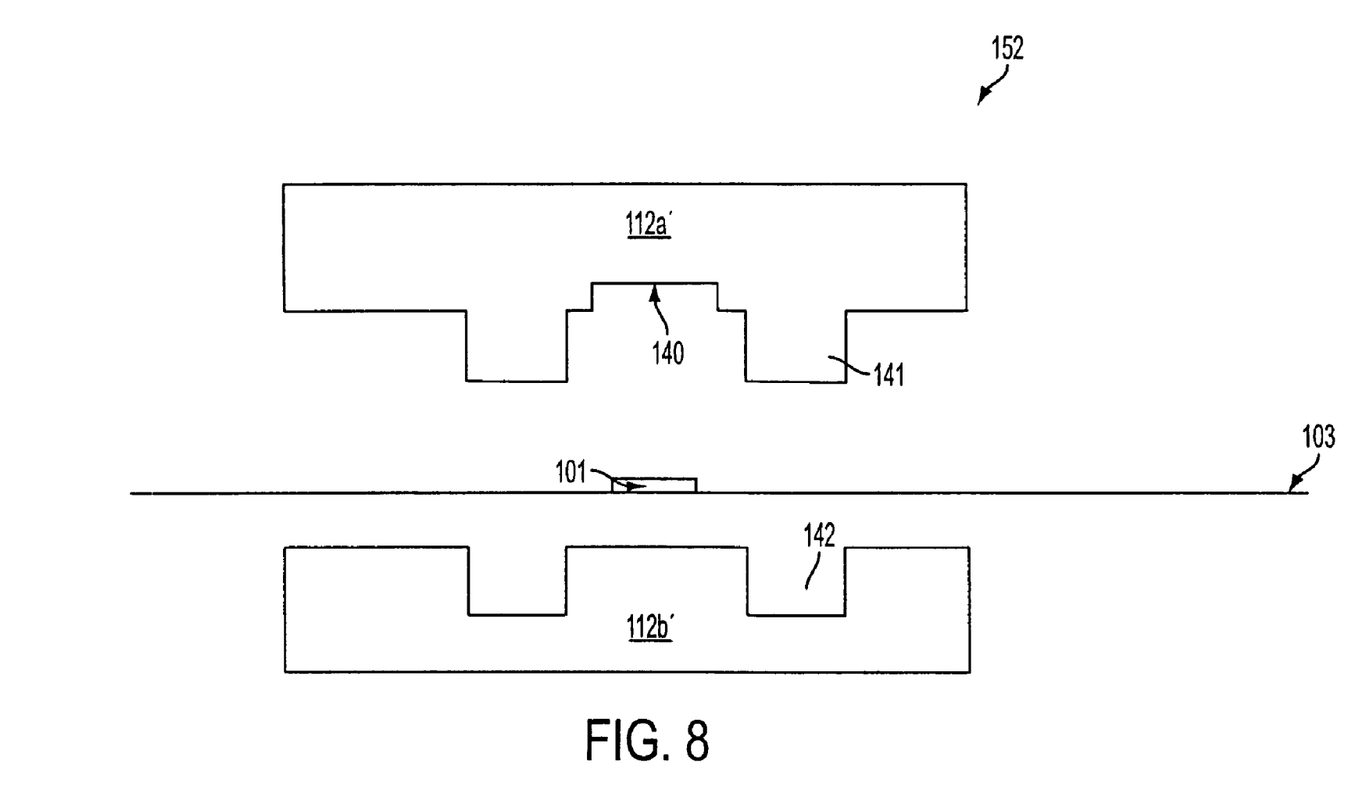
FIG. 8 is a cross-sectional view of a mold base that can be used in connection with the exemplary methods of FIGS. 2 and 6.

FIG. 8 shows an alternative mold 152 that can be used in accordance with either of the exemplary methods described above for manufacturing RFID tags 100 and 120. Mold 152 is similar to mold 112 (FIG. 2) in that it has a top portion 112a' and a bottom portion 112b'. In this embodiment, however, the mold 152 creates depressed rather than raised embossments on the inlay base 103. That is, the top portion 112a' contains multiple extrusions 141 and the bottom portion 112b' of the mold 152 contains mating recesses 142. Upon contact with the inlay base 103, recesses will be formed below a top surface of the inlay base 103, following the bottom portion 112b' of the mold. An additional recess 140 may be utilized in either the top 112a' or bottom portion 112b' of the mold to create space for the integrated circuit chip 101. This may be especially advantageous in accordance with the second method 220 described above, where the embossing is performed after individual inlays are sectioned (step 222). The chip recess 140 ensures that the integrated circuit chip 101 is not negatively affected when the mold is applied with pressure to the inlay.

Other molds may be used in connection with the embodiments of the invention. For example, although shown in the diagrams as one piece, the top portion 112a/112a' and bottom portion 112b/112b' may be formed of two or more components. For example, each embossment 105 on an RFID tag 100 could be formed by an individual mold. There could be open space between the individual molds or they could be interconnected by wires, for example. Utilizing more than one mold component could eliminate the concern of applying pressure to the integrated circuitry on the tag, without the need for a chip recess 140 formed in the mold. It should be appreciated that the embodiments of the invention are in no way limited by the structure of the molds 112, 152 utilized for embossing the RFID inlay base 103; molds can be made to fit the desired characteristics of the resulting RFID tag 100.

Figure 9:
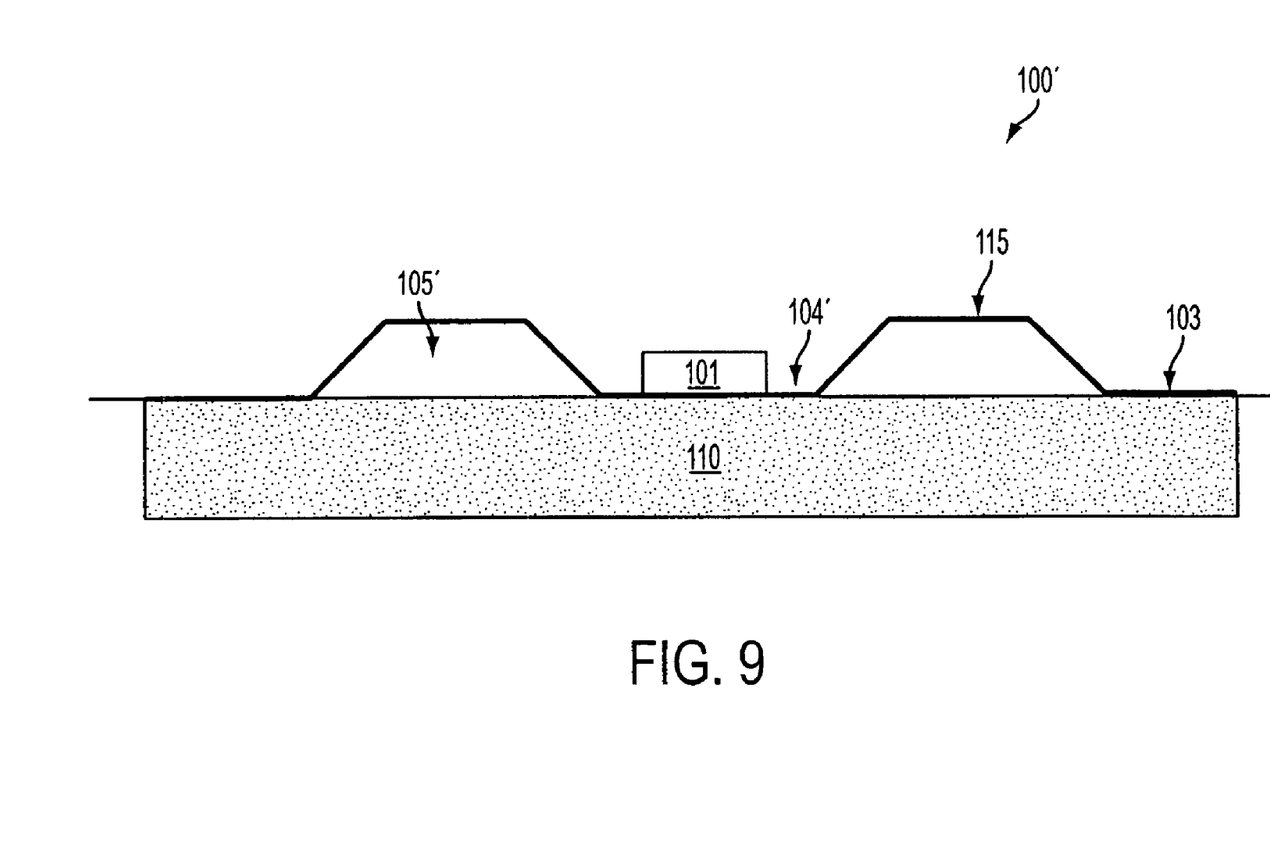
FIG. 9 is a cross-sectional view of another exemplary embodiment of an RFID tag constructed in accordance with the invention.

As shown in FIG. 9, the RFID tag 100' may have embossments 105' with non-rectangular shape. In FIG. 9, the embossments 105' are trapezoidal, although other shapes may also be used. The preferred shapes will have a flat top surface 115 to improve adhesion with the label 102. Due to the slanted sidewalls, the trapezoidal embossments 105' have slightly more surface area raised above the inlay base 103, which should improve the transmission characteristics of the RFID tag 100'.

Figure 10:
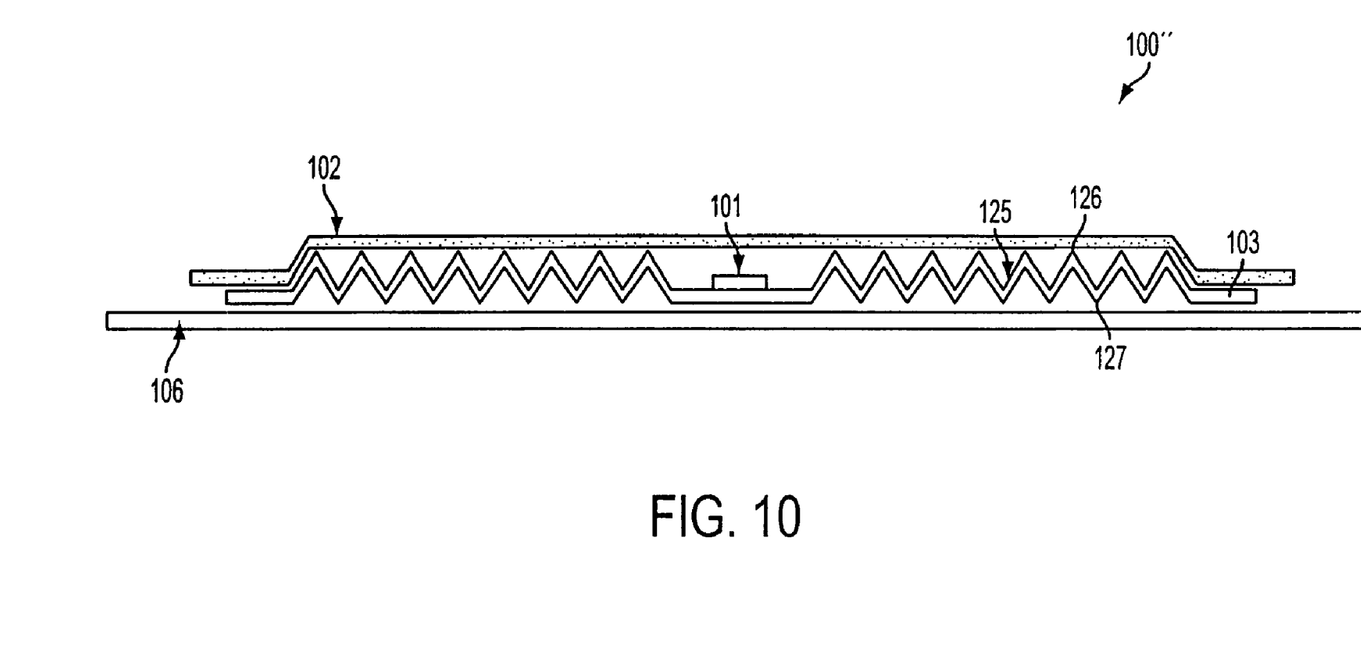
FIG. 10 is a cross-sectional view of another exemplary embodiment of an RFID tag constructed in accordance with the invention.

FIG. 10 shows another RFID tag 100" also having embossments 125 with non-rectangular shape. In FIG. 10, the embossments 125 are formed in a wave-like structure. The embossments 125 raise much of the inlay base 103 above the surface of the underlying material (such as material 110 shown in FIG. 1). The wave-like embossments 125 have low points 127 and high points 126. It should be understood that these low 127 and high 126 points could be of any desired dimension. As the number of wave-like embossments 125 increases, it increases the surface area on which the label 102 is placed. The wave-like embossments 125 can be formed using similarly structured molds, as described above with respect to the exemplary methods of manufacturing 200, 220.

Figure 11:
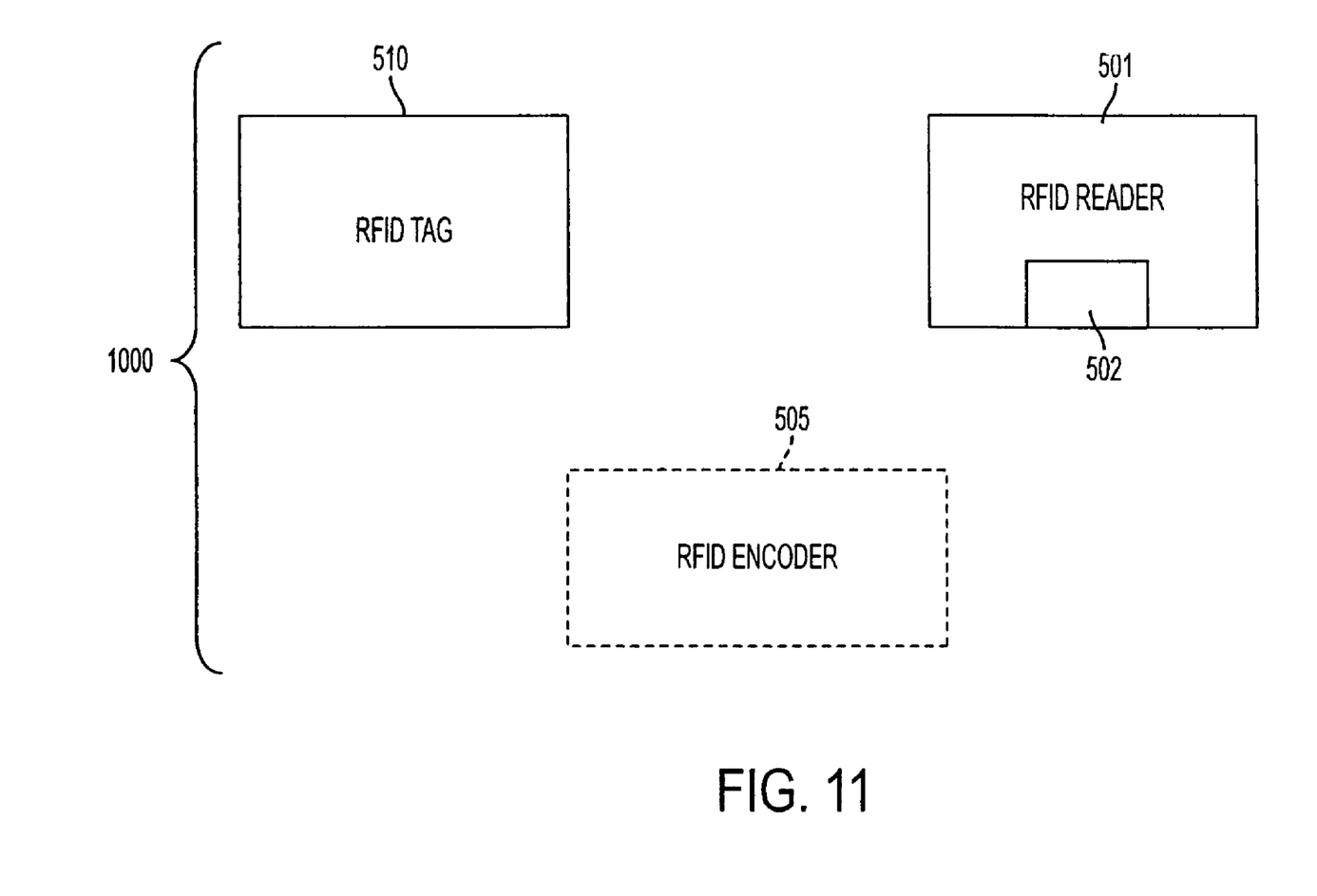
FIG. 11 illustrates a block diagram of an RFID system utilizing an exemplary RFID tag in accordance with the invention.

FIG. 11 illustrates a block diagram of a system 1000 that includes an RFID tag 510, that can be constructed in accordance with any of the exemplary embodiments described above. The system 1000 also includes an RFID reader 501, which can be of any size or shape, such as a portable, handheld device. As shown, the RFID reader 501 includes a processor 502, which may be internal or external to the reader 501 for processing data that is transmitted to or from RFID tag 510. For example, the processor 502 may be part of a host computer utilizing the RFID reader 501 as a peripheral device.

In operation of the system 1000, RFID reader 501 generates an RF field, generally covering a relatively short range. When the RFID tag 510 passes through the RF field generated by the RFID reader 501, the RFID tag's antenna picks up the RF field. In accordance with a preferred operation, the RFID tag's 510 antenna are sensitive to radio frequency waves in the range of the ultra low frequency band, preferably about 900 MHz. The RF waves picked up by the antenna provide energy to power up the chip in the RFID tag 510 and to transmit a response. The RFID reader 501 receives the response and decodes the data transmitted from the digital memory in the RFID tag 510. The decoded data can then be processed by the processor 502. The RFID system may also include an RFID encoder 505 for writing data to the RFID tag 510. Alternatively, the RFID tag 510 can be programmed in advance or the RFID reader 501 can be responsible for writing to the RFID tag 501 utilizing the same RF communication.

The above description and drawings are only to be considered illustrative of exemplary embodiments which achieve the features and advantages described above. Modification of, and substitutions to, specific operating conditions and structures can be made without departing from the spirit and scope of the invention. For example, although shown and described as passive RFID tags, it should be understood that the embodiments described herein can be employed with any type of wireless communication system. Accordingly, the claimed invention is not to be considered as being limited by the foregoing description and drawings, but is only limited by the scope of the appended claims.

What is claimed as new and desired to be protected by Letters Patent of the United States is:

1. A tag for wireless communication comprising:
    a material layer having a plurality of embossments therein such that there is a height differential between the material layer and raised or depressed surfaces of the embossments;
    an antenna for receiving data, the antenna being located over at least a portion of the material layer and covering at least one of the raised or depressed surfaces of the embossments; and
    an integrated circuit chip for storing data received from the antenna.

2. The tag of claim 1, wherein the antenna is a radio frequency antenna.

3. The tag of claim 2, further comprising a label covering at least a portion of each of the embossments and the antenna.

4. The tag of claim 2, further comprising a label that covers a top surface of each of the embossments.

5. The tag of claim 2, wherein the embossments are raised above a top surface of the material layer.

6. The tag of claim 5, wherein the integrated circuit chip is located at the top surface of the material layer between two embossments.

7. The tag of claim 5, wherein the embossments have a height of approximately five millimeters above the top surface of the material layer.

8. The tag of claim 2, wherein the embossments are recessed below a top surface of the material layer.

9. The tag of claim 1, wherein the embossments cover about fifty to about sixty percent of the surface area of the tag.

10. The tag of claim 1, wherein the embossments cover more than sixty percent of the surface area of the tag.

11. An RFID system comprising:
    an RFID tag, comprising:
    a material base layer with a first surface level and having a plurality of portions at a second surface level such that there is a height differential between the first and second surface levels;
    an RFID antenna for receiving data over at least a portion of the first surface level and one of the plurality of portions at the second surface level;
    an integrated circuit chip; and
    a label located over the portions of the material base layer at the second surface level; and
    an RFID reader for reading data from the RFID tag.

12. The RFID system of claim 11, wherein the integrated circuit chip is located on a portion of the antenna above the second surface level.

13. The RFID system of claim 11, wherein the portions of the material base layer at the second surface level are rectangular embossments.

14. The RFID system of claim 11, wherein the portions of the material base layer at the second surface level are trapezoidal embossments.

15. A method of manufacturing an RFID tag, the method comprising:
    providing an RFID inlay roll including an inlay base material, RF antenna, and integrated circuit chips;
    embossing the inlay base material with a mold base having a top portion and a bottom portion respectively to top and bottom surfaces of the inlay material to create a plurality of first and second surfaces, the mold base having a cut-out region for ensuring that circuitry on the inlay base material is not subjected to pressure;

sectioning the inlay roll to create individual inlays; and applying a label over at least a portion of the first surfaces of the inlays.

16. The method of claim 15, wherein the step of sectioning is performed prior to the step of embossing.

17. The method of claim 15, wherein the step of applying a label comprises adhering a pre-printed label to the embossed inlay material layer, such that the label covers both the first and second surface levels.

18. The method of claim 15, wherein the step of applying a label comprises adhering a pre-printed label to the embossed inlays such that the label contacts the embossments only at the second surfaces.

19. The method of claim 15, wherein the step of embossing is performed such that the integrated circuit chips are not damaged.

20. A method of manufacturing an RFID tag, the method comprising:

providing an RFID inlay roll including inlay base material, RF antenna, and integrated circuit chips;

applying labels over at least a portion of the inlay base material;

sectioning the inlay roll to create individual inlays with labels; and embossing the inlay base material to create a plurality of first and second surfaces such that there is a height differential between the first and second surface levels and the RF antenna covers at least a portion of each of the first and second surface levels.

21. The method of claim 20, wherein the step of embossing is performed such that the integrated circuit chips are not damaged.

22. The method of claim 20, wherein the step of embossing is performed prior to the step of sectioning.

23. An RFID tag comprising:

an inlay base having a first surface, the inlay base being embossed to create a plurality of raised second surfaces above the first surface;

an RF antenna attached over portions of the inlay base, including at least a part of the first surface and one of the raised second surfaces;

an integrated circuit chip attached to the antenna, the chip being located at the first surface between two embossed second surfaces;

a label attached to the second surfaces; and a liner attached to a bottom of the inlay base, the liner for adhering the RFID tag to a material object.

24. The RFID tag of claim 23, wherein the embossed second surfaces are rectangular in shape.

25. The RFID tag of claim 23, wherein the embossed second surfaces are trapezoidal in shape.

26. The RFID tag of claim 23, wherein the embossed second surfaces are wave-like in shape.

27. An RFID tag comprising:

an inlay base having a plurality of embossments formed therein such that there is a height differential between a top surface of the inlay base and raised or depressed surfaces of the embossments;

an RF antenna attached over portions of the inlay base and at least one of the embossments;

an integrated circuit chip attached to the antenna, the chip being located between two embossments;

a label attached to the inlay base such that it follows the shape of the embossments; and a liner attached to a bottom of the inlay base, the liner for adhering the RFID tag to an object.

* * * * *